Sept. 1, 1959      L. H. MORIN      2,902,235
SNAP-ON RIMS FOR PLASTIC SPOOLS
Filed Aug. 22, 1955      3 Sheets-Sheet 1
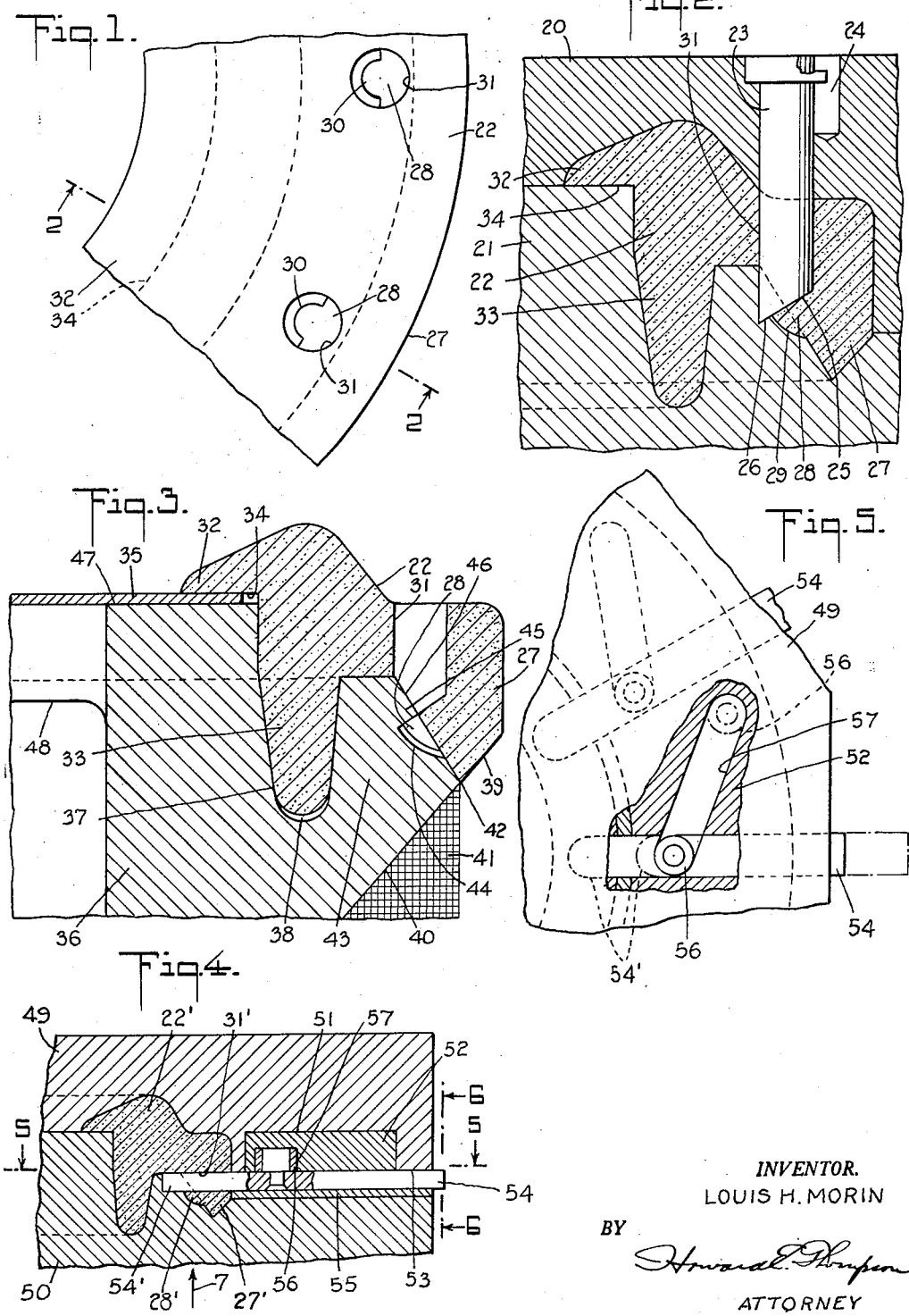
INVENTOR.
LOUIS H. MORIN
BY
ATTORNEY Sept. 1, 1959  L. H. MORIN  2,902,235
SNAP-ON RIMS FOR PLASTIC SPOOLS
Filed Aug. 22, 1955  3 Sheets-Sheet 2
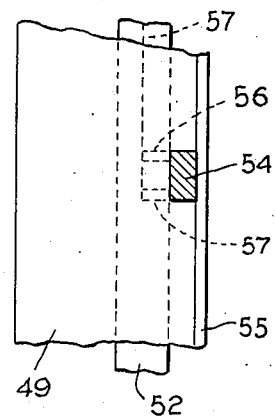
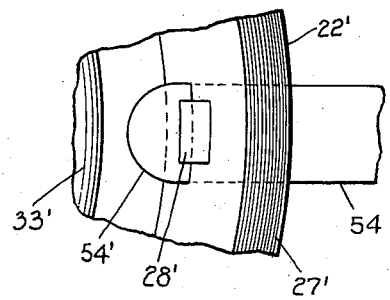
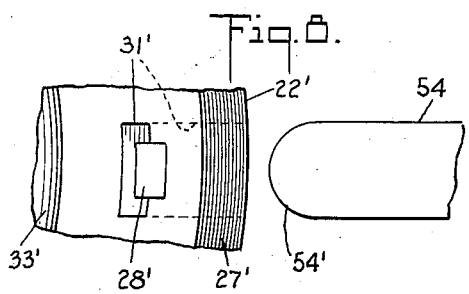
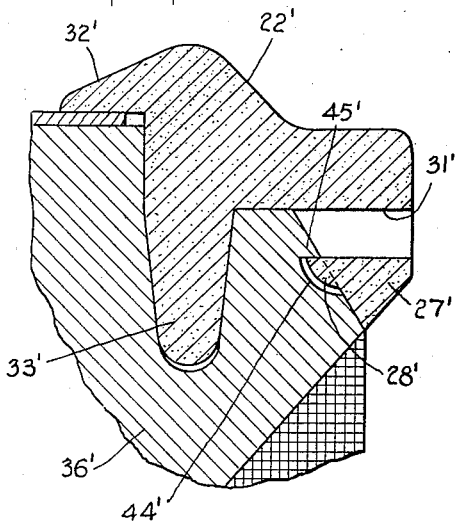
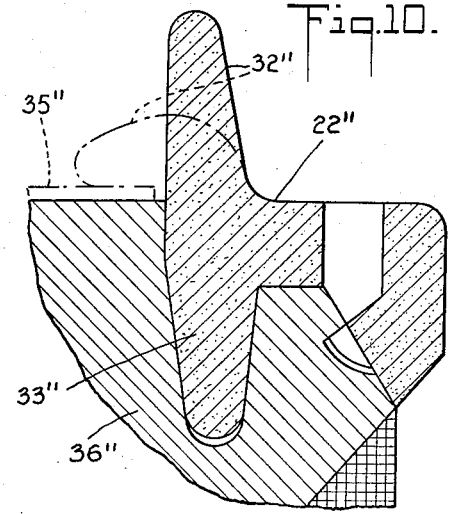
INVENTOR.
LOUIS H. MORIN
BY
*Howard E. Thompson*
ATTORNEY Sept. 1, 1959  L. H. MORIN  2,902,235
SNAP-ON RIMS FOR PLASTIC SPOOLS
Filed Aug. 22, 1955  3 Sheets-Sheet 3

INVENTOR.
LOUIS H. MORIN
BY
*Howard E. Thompson*
ATTORNEY

United States Patent Office 2,902,235
Patented Sept. 1, 1959

2,902,235

SNAP-ON RIMS FOR PLASTIC SPOOLS

Louis H. Morin, Bronx, N.Y., assignor to Coats & Clark Inc., New York, N.Y., a corporation of Delaware Application August 22, 1955, Serial No. 529,694

11 Claims. (Cl. 242—118.61)

This invention relates to plastic spools employing pre-moulded spools or spool parts upon which pre-moulded plastic discs or rims can be snapped into position upon the ends thereof and retained against forcible displacement therefrom. More particularly, the invention deals with spool structures of the character described on which the mounting of labels upon spool ends is facilitated. Another advantage is in providing rims of a color to match, or contrast with, the color of the thread mounted upon the spool.

Still more particularly, the invention deals with spool structures on which thread can be mounted upon the spools prior to or after attachment of the rims to the spool ends and the mounting of labels on the spool ends.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is an enlarged plan view of a portion of a rim made according to my invention.

Fig. 2 is a large partial sectional view through the moulds for forming rims, such as shown in Fig. 1 of the drawing, the section through the rim being on the line 2—2 of Fig. 1.

Fig. 3 is an enlarged sectional detail view of one corner portion of a spool end showing the rim of Figs. 1 and 2 mounted thereon and indicating the support of a label at one end of the spool.

Fig. 4 is a view, similar to Fig. 2, showing another method of forming a rim, generally of the construction shown in Figs. 1 to 3, inclusive.

Fig. 5 is a sectional and plan view of part of the mould structure employed in forming the rim of Fig. 4, the section being substantially on the line 5—5 of Fig. 4.

Fig. 6 is a detail sectional view on the line 6—6 of Fig. 4.

Fig. 7 is a bottom plan detail view of the rim, diagrammatically showing a core part in operative position, note arrow 7 in Fig. 4.

Fig. 8 is a view, similar to Fig. 7, with the core part in retracted position.

Fig. 9 is an enlarged detail view of a rim and spool assemblage, showing the rim formed with the moulds illustrated in Fig. 4.

Fig. 10 is a view, similar to Fig. 3, showing a modified form of rim in the moulded position in full lines and in the label holding position in dot-dash lines.

Figure 11:
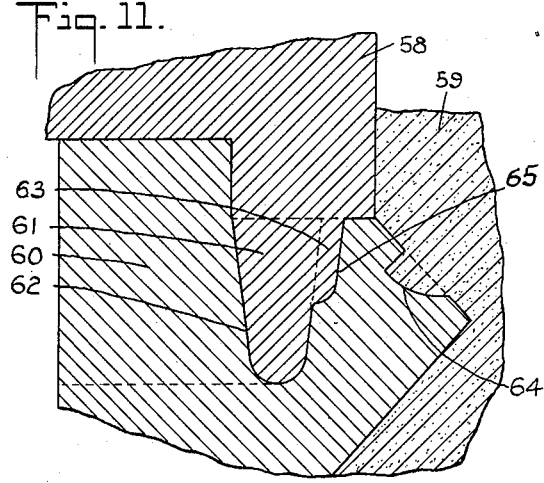
Fig. 11 is a detail sectional view, illustrating the method of forming a modified form of spool.
Figure 12:
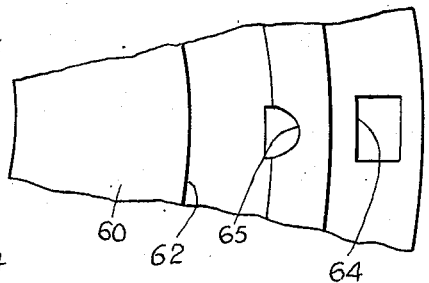
Fig. 12 is a plan view of a sectional portion of the spool shown in Fig. 11.

This application constitutes a continuation-in-part of my prior application, Serial Number 482,462, filed January 18, 1955, the present invention dealing primarily with disc or rim ends for spools of various types and kinds, wherein the discs or rim ends are snapped into position and retained against accidental or forcible displacement from the spool end. In some instances, as and when desired, adhesive may also be used, particularly with spool assemblages such as disclosed in Figs. 3, 9 and 10 of the drawing.

Figure 13:
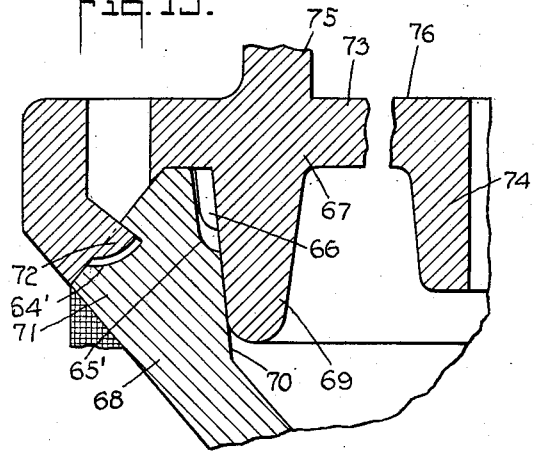
Fig. 13 is a sectional view, illustrating a spool and rim assemblage, showing a modified form of spool and rim.
Figure 15:
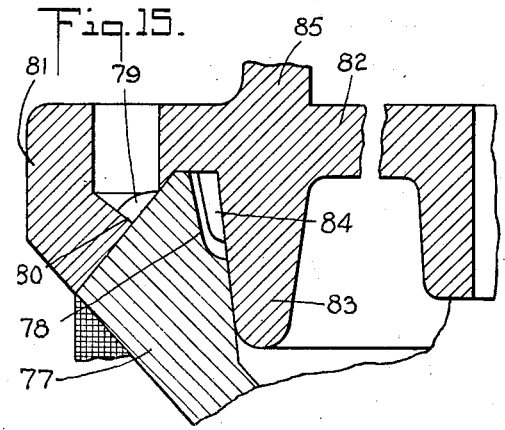
Fig. 15 is a view, similar to Fig. 13, showing another modification.

Other methods of rimming spool ends and applying labels thereto are taught in my prior application, Serial Number 442,140, filed July 8, 1954, this application illustrating the method of spinning-over or forming the label retaining pieces or members, as would be the case with the structure shown in Figs. 10, 13 and 15.

In order to clearly understand the formation of the discs or rims, certain of the views, as later described, show the dies or moulds as well as cores for forming the disc or rim structures. For example, in Fig. 2 of the drawing, I have shown at 20, 21 a pair of dies or moulds for forming a plastic rim 22, the die or mould 20 including a core pin 23, keyed as seen at 24, for proper positioning of a lower bevelled surface 25 of the pin to seat on the die or mould 21, as seen at 26, and to form, on the outer, inwardly extending annular flange 27 of the rim 22, projecting hook members 28. The hook members 28 have rounded lower surfaces 29, formed by the contour of the die or mould 21.

The members 28 are spaced circumferentially on the rim, as noted in part in Fig. 1 of the drawing, and, as viewed in plan, the members 28 have rounded outer surfaces, as noted at 30, in Fig. 1. This construction minimizes frictional engagement with the spool in snapping the rim into place, as later described.

The core pins 23 form, above the members 28, apertures 31. The dies 20, 21 are so constructed as to form, on the rim at its outer surface and inwardly of the flange 27, a label retaining piece or member 32, which extends inwardly and radially beyond an annular tapered rib 33 which is disposed inwardly of the flange 27 and spaced with respect thereto. Between piece 32 and the end face of spool 36 is a label receiving recess 34, as will be clearly noted in Fig. 3, in which figure part of a label 35 is shown.

In Fig. 3 of the drawing, I have shown at 36 a corner portion of a spool end, or rim end portion thereof, which has a tapered annular socket 37 for reception of the rib 33, the socket 37 being preferably deeper than the rib, so as to provide an air space at the inner end of the rim, as noted at 38. The rib 33, in addition to reinforcing and strengthening the rim 22, also serves to reinforce the spool end and, further, alines the rim upon the spool end, so that the bevelled inner wall 39 of the flange 27 of the rim is in alinement with the bevelled wall 40 of the spool.

At 41 I have diagrammatically illustrated the arrangement of thread upon the spool, including the wall 40 thereof. The thread is preferably wound to a point in alinement with the outer extremity 42 of the peripheral portion 43 of the spool so that, when desired, the thread can be pre-wound upon the spool, prior to attachment of the rim 22 therewith.

The peripheral portion 43 of the spool has an annular undercut recess 44, which produces an annular retaining or coupling ledge 45, in connection with which the members 28 operate in retaining the rims against displacement from the spool ends.

At this time, it is pointed out that the showing in the accompanying drawings is very much enlarged for clarity in the showing. It will be apparent, however, that, in pressing the rims 22 onto the spool ends, the rounded portions 30 of the members 28 will ride-over the bevelled walls 46 of the retaining or coupling ledge 45. The flange 27 springs outwardly to a slight extent in this operation.

It will appear, from a consideration of Fig. 3 of the drawing, that the member 32 supports the label 35 upon the end surface 47 of the spool end, the spool end also having circumferentially spaced ribs, one of which is indicated at 48 which further supports the label 35 at the central portion of the spool.

With the structure shown in Figs. 1 to 3, inclusive, the hook members 28 are formed by the use of core pins 23 vertically disposed in the die or mould 20.

In Figs. 4 to 9, inclusive, I have diagrammatically shown a different method of coring in producing a rim 22', substantially identical with the rim 22, the only difference being that, instead of having the apertures 31 opening through the ends of the spool rim, apertures 31' open through the flange 27' of the rim 22, as clearly noted in Fig. 9 of the drawing, otherwise the structure of the rim 22' will be identical with the rim 22, in other words, including the circumferentially spaced hook members 28', the annular rib 33' and the label retaining piece or member 32'.

In Fig. 9 of the drawing is shown, at 36', a spool corner portion, which differs from the spool corner 36 simply in the shape of the recess 44' and the retaining or coupling ledge 45' to cooperate with the modified form of hook member 28' employed. No further detail description of the assemblage, as shown in Fig. 9, will be given, as the same is otherwise similar to the structure shown in the assemblage of Fig. 3.

To form the modified type of rim 22', a pair of dies or moulds 49 and 50 are employed and are shown, in part, in Fig. 4 of the drawing and also in Figs. 5 to 8, inclusive. The die or mould 49 is slotted, as seen at 51, to receive a reciprocating cam ring 52 and, further slotted, as seen at 53, to receive circumferentially spaced radially movable cores 54. The cores 54 and cam ring 52 are held upon the surface of the die or mould 49 by a retaining plate 55.

Suitable means, not shown, will be employed for actuating the cam ring 52. Mounted on each of the cores 54 are rollers 56, which are adapted to operate in cam grooves 57 in the ring 52 in movement of inner rounded end portions 54' of the cores 54 into the operative position, clearly noted in Fig. 4 of the drawing, to form the apertures 31' and into a retracted position, as indicated in dotted lines in Fig. 5 of the drawing, in operation of separating the dies or moulds 49 and 50 in removing the moulded plastic rim 22' therefrom.

Considering Fig. 10 of the drawing, in this figure, I have shown at 36'' part of the corner portion of a spool end, identical with the spool end shown in Fig. 3 of the drawing, in which a modified form of snap-on rim 22'' is employed, the sole difference between the rim 22'' and the rim 22 being that the label retaining piece or member 32'' is initially moulded in an upright position, as shown in full lines in Fig. 10 and then spun-over into label engaging position, as noted in dotted lines in said figure, the label being indicated in dotted lines at 35''. As the structure of the spool assemblage shown in Fig. 10 is otherwise identical with the structure of Fig. 3, no further detail description is deemed to be necessary.

In Figs. 11 to 16, inclusive, I have shown modified forms of disc or rim structures and spool ends, as well as part of the die or mould structure for forming one of the modified spool ends. Considering Fig. 11 of the drawing, at 58 and 59 I have shown a pair of dies or moulds for forming a spool or spool ends 60. The structure of this spool end is generally similar to the spool end shown at 36 in Fig. 3 of the drawing, the primary difference being that the core portions 61 of the die or mould 58, which forms the annular recess 62 in the spool ends 60, similar to the recess 37, includes a key portion 63 and, instead of forming an annular undercut recess, as at 44 in Fig. 3, a plurality of circumferentially spaced undercut recesses 64 are employed, the recesses 64 being of the same cross-sectional contour as the annular recess 44. Noting now Fig. 12 of the drawing, in which a small section plan of the spool end is shown, it will appear that the key 63 forms a key recess 65 in the spool end, which will preferably be in alinement with one of circumferentially spaced recesses 64. The recesses 64 will be similar in number and spacing to the hook members 28 of the rim, shown in Fig. 3 of the drawing, and the rim employed will be modified solely to the extent of including a key to enter the key recess 65 to aline the rim on the spool end, as will be apparent. One of such keys is shown in the modified illustration of Fig. 13 of the drawing at 66 on a disc or rim 67.

In Fig. 13 of the drawing, the spool end or rim end portion 68, which is shown, is of a modified structure, as compared with the spool end 60, in that the recess 62 is eliminated and the annular rib 69 of the disc or rim 67 fits within a tapered wall 70 on the outer peripheral portions 71 of the spool end 68. The peripheral portion 71 includes a key recess 65', similar to the key recess 65, for reception of the key 66. This portion also includes circumferentially spaced recesses 64', similar to the spaced recesses 64, for receiving hook members 72, substantially identical with the members 28. The disc or rim 67 differs from the rim 22 in including an inwardly extending radial wall portion or circumferential ribs 73 for support of a central bearing or hub portion 74. At the outer surface of the disc or rim 67 is also provided an annular label retaining piece or member shown, in part, at 75, which will be generally similar to the member 32'', shown in Fig. 10, and can be shaped or spun to engage a label supported upon the outer surface 76 of the spool.

In some instances, the annular portion, such as shown at 75 in Fig. 13 of the drawing, can be dispensed with where the label retaining feature of the rim is not desired and this is applicable to showings in the other views heretofore and later mentioned. When not employed, the labels can be directly applied to the ends of the discs or rims; whereas, in other cases, the imprints can be moulded directly in the rims, as is known in this art.

Figure 14:
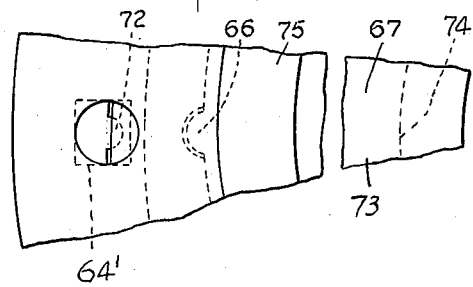
Fig. 14 is a sectional plan view of part of the rim shown in Fig. 13.

In Fig. 14 of the drawing, I have shown, in plan, a small section of the disc or rim 67 to illustrate the position of the key 66 with respect to one of the circumferentially spaced hook members 72.

As the assemblages of Figs. 13 and 14 are otherwise generally similar to the showing in Fig. 3 of the drawing, no further detailed description is deemed to be necessary. It might be said, however, that the annular rib 69 serves as a reinforcing rib, notwithstanding the fact that it does not enter an annular socket in the spool end. These ribs, as applied to the various showings, in addition to facilitating alinement of the parts, further provide a strong support retaining the discs or rims against displacement from the spool ends in the event of the presence of a crack or split in the disc or rim at any circumferential point. The ribs maintain the discs or rims in position upon the spool ends at all times, in combination with the snap-on holding means which is employed.

Figure 16:
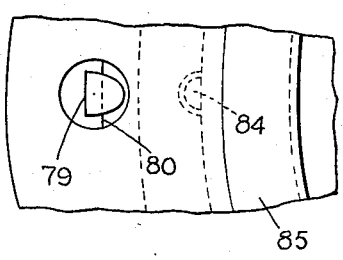
Fig. 16 is a sectional plan view of the assemblage, as shown in Fig. 15.

In Figs. 15 and 16 of the drawing is shown a slight modification of the structure shown in Figs. 13 and 14. In Fig. 15 of the drawing, I have indicated, at 77, part of a spool end, which is generally similar to the spool end 68 and includes a key recess 78, similar to the recess 63'. However, instead of employing circumferentially spaced recesses, as at 64', circumferentially spaced hook members 79 are employed to operatively engage bevelled ledges 80 which are formed on the outer rim portion 81 of a disc or rim 82. The disc or rim 82 is generally similar to the disc or rim 67 in including an annular rib 83, similar to the rib 69, the key 84, similar to the key 66, and the member 85, similar to the member 75. In other words, the dies or moulds, such as 20, 21, and core pins, such as 23, are shaped in such manner as to eliminate the hook members 28 and dies or moulds, such as illustrated at 58 and 59 of Fig. 11, will be modified so as to form the hook members 79, instead of the recesses 64.

In this connection, it will be apparent that the shape or contour of the dies or moulds employed is such as to facilitate separation of the dies in forming the recesses, as at 64, and members as at 79, it being apparent in this connection that the die or mould 59 is composed of separate parts.

With the several forms of construction shown, it will be apparent that, in all instances, the discs or rims can be prefabricated and readily snapped-on to spool ends before or after thread has been wound upon the spools, this method of procedure facilitating production of thread spools from the standpoint of types of plastic materials employed in the spool body and in the end rims, not only from a standpoint of color, but also from the standpoint of the type of material employed. In this connection, it will be apparent that the rims can be formed of a more expensive plastic material than that which is employed in moulding the plastic spools. Further, the plastic spools may be made of different forms and constructions with regard to the type and kind of spool employed and the method of its construction and reinforcement. The present snap-on rim construction can be applied to various types of spool body structures by simply shaping the spool ends in manners such as here illustrated to facilitate reception of snap-on rims of the type and kind disclosed.

For purposes of description, the spool assemblage may be said to comprise a spool part and a rim part. In the present showing, only one end portion of a spool is shown. It will be understood, however, that rim parts are mounted on each end of the spool, the ends of the spool being of identical construction.

To further aid the description, a brief summary of the structure of the spools may be given. Referring to Fig. 3, this spool comprises the rim or rim part 22 mounted on the end portion 36 of the spool part. The rim has an annular flange 27 and an annular label-retaining piece 32 inwardly of which is a label-receiving recess 34. End portion 36 of the spool part has an annular peripheral portion (represented by bevelled walls 46 and including the bevelled walls which extend to the extremity 42) which is engaged by the annular flange 27 of the rim. End portion 36 also has an annular extension (disposed between rib 33 and the spool bore), which is of smaller diameter than the said annular peripheral portion, and which receives on its end face 47 the label 35. The spools of Figs. 9, 10, and 11 also have the foregoing construction, as do the spools of Figs. 13 and 15 except that the latter two modifications omit the annular extension on the spool part.

In Fig. 3 the interlocking means on the rim and spool parts comprises a group of circumferentially spaced locking lugs or projections 28 on the annular flange 27 which enter the annular groove 44 and engage the ledge 45. The same type of construction appears in Figs. 9 and 10. However, in Figs. 11 and 13 the annular groove is replaced by a group of circumferentially spaced recesses 64 and 64', respectively. In Fig. 15 the position of the circumferentially spaced lugs and recesses are reversed, so to speak, by comparison with Fig. 13.

It may be noted that in Figs. 11, 13, and 15 the rim part cannot be rotated relatively to the spool part even though adhesive is not used. In this connection, adhesive may be employed with any of the modifications. The spool part may be substantially hollow or may be provided with internal reinforcing ribs. Also, if desired the hub 74 of Fig. 13 may extend the length of the spool. The number of recesses in the spool part, such as the recesses 64 of Fig. 11, is variable. In all the modifications the rim part cannot be pulled or sprung off the spool part, whether or not adhesive is used to hold the two parts together.

Having fully described my invention, what I claim as new and desire to secure by Letters Patent is:

1. A spool assemblage, comprising a spool part and a rim part for mounting on an end of the spool part, said parts having interengaging means facilitating snap-on engagement of the rim part with the spool part, said interengaging means comprising circumferentially spaced hook members on one part engaging correspondingly spaced ledges on the other part, means for alining and keying the parts one with respect to the other, and means comprising a circumferential rib on the rim part engaging an annular socket in the spool part for keying the parts together and reinforcing said parts.

2. A light weight, plastic thread spool for household use comprising a preformed, integral, spool body having enlarged, incomplete, rim end portions; a separate, preformed, snap-on, annular rim on each rim end portion which completes said rim end portion; end faces of the spool having a bore opening therein and being adapted to support a label; each said rim and rim end portion having interlocking means for preventing separation of the rim in a longitudinal direction relatively to the spool, said means comprising circumferentially spaced projecting members each interfitting with a recess; an annular rib on said rim spaced radially outwardly of said bore opening and radially inwardly of said interlocking means, a recessed portion on said rim end portion for receiving said annular rib, said rib engaging a wall of said recessed portion and serving to aline and reinforce the rim on the spool; a label on each end face of the spool, an integral, annular flange on the rim in contact with a peripheral portion of the label and holding the label against said end face; and said spool body and rims each being composed of plastic with said spool body being of less expensive plastic than the rims.

3. The spool of claim 2 wherein said recess of said interlocking means is a circumferentially continuous one.

4. The spool of claim 2 wherein said recess of said interlocking means is circumferentially spaced to correspond with the spacing of said projecting members, and wherein said rim is locked against rotation relatively to the spool body.

5. The spool of claim 4 wherein said spaced projecting members and spaced recesses are disposed, respectively, on the rim and the spool body.

6. The spool of claim 4 wherein said spaced projecting members and spaced recesses are disposed, respectively, on the spool body and the rim.

7. The spool of claim 2 wherein said recessed portion on said rim end portion is an annular socket.

8. The spool of claim 2 wherein each said rim entirely overlies each end face of said spool body.

9. The spool of claim 2 wherein each said rim only partially overlies each end face of said spool body.

10. A light weight, plastic thread spool for household use comprising a preformed, integral, spool body having rim end portions; a separate, preformed, snap-on, annular rim on each rim end portion; end faces of the spool having a bore opening therein; each said rim and rim end portion having interlocking means for preventing separation of the rim in a longitudinal direction relatively to the spool, said means comprising circumferentially spaced projecting members each interfiitting with a recess; an annular rib on said rim spaced radially outwardly of said bore opening and radially inwardly of said interlocking means, a recessed portion on said rim end portion for receiving said annular rib, said rib engaging a wall of said recessed portion and serving to aline and reinforce the rim on the spool; and said spool body and rims each being composed of plastic with said spool body being of less expensive plastic than the rims.

11. A spool assemblage, comprising a spool part and a rim part for mounting on an end of the spool part, said parts having interengaging means facilitating snap-on engagement of the rim part with the spool part, said means comprising circumferentially spaced hook members on one part engaging correspondingly spaced ledges on the other part, said means preventing removal of the rim part in a longitudinal direction relatively to said spool part, and means for alining and keying the parts one with respect to the other.

References Cited in the file of this patent

UNITED STATES PATENTS

| | | |
|---|---|---|
| 611,343 | Tilden | Sept. 27, 1898 |
| 974,603 | Schmidt | Nov. 1, 1910 |
| 1,028,877 | Herrick | June 11, 1912 |
| 1,140,868 | Bennett | May 25, 1915 |
| 2,000,372 | Beck | May 7, 1935 |
| 2,527,519 | Bliss | Oct. 31, 1950 |
| 2,535,188 | Beckner | Dec. 26, 1950 |
| 2,659,547 | Broadbent et al. | Nov. 17, 1953 |
| 2,683,572 | Morin | July 13, 1954 |

FOREIGN PATENTS

| | | |
|---|---|---|
| 2,079 | Great Britain | of 1854 |
| 147,244 | Australia | July 8, 1952 |
| 534,172 | Germany | Sept. 23, 1931 |